US011868701B1

(12) United States Patent
Lopez et al.

(10) Patent No.: US 11,868,701 B1
(45) Date of Patent: *Jan. 9, 2024

(54) TEMPLATE FOR CREATING CONTENT ITEM

(71) Applicant: Instasize, Inc., Sandy, UT (US)

(72) Inventors: Hector Lopez, Salt Lake City, UT (US); Eddy Homez-Devroom, Salt Lake City, UT (US); Omar Arambula, Salt Lake City, UT (US)

(73) Assignee: Instasize, Inc., Sandy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/933,420

(22) Filed: Sep. 19, 2022

Related U.S. Application Data

(63) Continuation of application No. 16/917,575, filed on Jun. 30, 2020, now Pat. No. 11,449,664.

(Continued)

(51) Int. Cl.
*G06F 3/0484* (2022.01)
*G06F 40/117* (2020.01)
(Continued)

(52) U.S. Cl.
CPC .......... *G06F 40/117* (2020.01); *G06F 40/106* (2020.01); *G06F 40/186* (2020.01); *G06T 11/60* (2013.01)

(58) Field of Classification Search
CPC .... G06F 40/117; G06F 40/106; G06F 40/186; G06T 11/60
See application file for complete search history.

(56) References Cited

U.S. PATENT DOCUMENTS 5,835,712 A * 11/1998 DuFresne ........... G06F 21/6227
709/219
6,229,541 B1 * 5/2001 Kamen ............... G06F 16/9558
375/E7.008

(Continued)

FOREIGN PATENT DOCUMENTS

WO     2014172601 A1    10/2014
WO     2018/071562 A1    4/2018
WO     2019171128 A1    9/2019

OTHER PUBLICATIONS

Abbott, Elisa, "How to Design Awesome Instagram Stories", Jan. 23, 2019, Storrito Blog (Year: 2019).

(Continued)

*Primary Examiner* — Hassan Mrabi
(74) *Attorney, Agent, or Firm* — VLP Law Group LLP; Michel Bohn

(57) ABSTRACT

A system for generating and using templates is described. In an example embodiment, a system may receive a template list and previews of templates in the template list and display the previews to a user via a graphical interface. In some instances, the system may receive an input selecting a certain template from among the templates from the user via the graphical interface, retrieve a template file describing the certain template, and display a content item of the user integrated into the certain template based on the template file. In some embodiments, the system may facilitate unlocking or providing access to templates, the template file may be associated with an asset package including files used when applying the template file to content, or the template may include multiple template pages into which content elements may be inserted to create an arrangement or sequence of content.

20 Claims, 10 Drawing Sheets
(4 of 10 Drawing Sheet(s) Filed in Color)

US 11,868,701 B1

Page 2

Related U.S. Application Data

(60) Provisional application No. 62/869,057, filed on Jul. 1, 2019.

(51) Int. Cl.
- *G06F 40/106* (2020.01)
- *G06T 11/60* (2006.01)
- *G06F 40/186* (2020.01)

(56) References Cited

U.S. PATENT DOCUMENTS

| | | | |
|---|---|---|---|
| 6,701,345 B1 | 3/2004 | Carley et al. | |
| 7,013,428 B1* | 3/2006 | Kamen | G06F 21/84 715/231 |
| 7,403,901 B1 | 7/2008 | Carley et al. | |
| 7,477,800 B2 | 1/2009 | Avidan et al. | |
| 8,078,963 B1* | 12/2011 | Rosner | G06F 40/186 715/255 |
| 8,990,672 B1* | 3/2015 | Grosz | G06F 40/186 715/202 |
| 9,135,663 B1* | 9/2015 | Heiferman | G06F 3/04842 |
| 9,264,462 B2* | 2/2016 | Heiferman | G06Q 30/02 |
| 10,033,767 B2* | 7/2018 | Pashman | H04L 63/20 |
| 10,140,392 B1* | 11/2018 | Bowen | G06F 40/186 |
| 10,305,758 B1* | 5/2019 | Bhide | G06F 11/3409 |
| 10,325,013 B2* | 6/2019 | Mondal | G06F 40/106 |
| 10,594,774 B2 | 3/2020 | Thomas | |
| 10,742,433 B2* | 8/2020 | Whalin | H04L 65/00 |
| 10,867,081 B2* | 12/2020 | Bowen | G06F 3/0482 |
| 10,942,978 B1 | 3/2021 | Paul | |
| 2002/0087352 A1* | 7/2002 | Armstrong | G06Q 30/02 705/1.1 |
| 2002/0108034 A1 | 8/2002 | Hashem et al. | |
| 2004/0001106 A1 | 1/2004 | Deutscher et al. | |
| 2004/0133598 A1 | 7/2004 | Dobrowski et al. | |
| 2005/0084232 A1* | 4/2005 | Herberger | G11B 27/34 386/282 |
| 2005/0246649 A1 | 11/2005 | Wilhelm | |
| 2006/0161850 A1* | 7/2006 | Seaberg | G06F 40/186 715/744 |
| 2007/0005634 A1 | 1/2007 | Selca et al. | |
| 2007/0038567 A1* | 2/2007 | Allaire | H04N 21/2547 705/50 |
| 2007/0079236 A1* | 4/2007 | Schrier | G06F 40/114 715/209 |
| 2008/0052163 A1 | 2/2008 | Koh | |
| 2008/0270358 A1* | 10/2008 | Chatow | G06F 16/958 |
| 2008/0276175 A1* | 11/2008 | Kim | G11B 27/34 715/723 |
| 2008/0295092 A1 | 11/2008 | Tan et al. | |
| 2009/0150758 A1* | 6/2009 | Gejdos | G16H 15/00 715/764 |
| 2010/0017371 A1* | 1/2010 | Whalin | G06Q 10/109 707/E17.014 |
| 2011/0072035 A1* | 3/2011 | Gaucas | G06K 15/02 707/769 |
| 2011/0161130 A1* | 6/2011 | Whalin | H04W 4/21 705/14.5 |
| 2011/0239158 A1* | 9/2011 | Barraclough | G06F 3/0482 715/808 |
| 2011/0280497 A1* | 11/2011 | Berger | G06V 40/172 382/306 |
| 2011/0289142 A1* | 11/2011 | Whalin | G06Q 30/02 709/203 |
| 2011/0289433 A1* | 11/2011 | Whalin | H04L 51/52 715/753 |
| 2011/0305433 A1* | 12/2011 | Singer | H04N 21/2668 386/290 |
| 2012/0173976 A1 | 7/2012 | Herz et al. | |
| 2012/0179980 A1* | 7/2012 | Whalin | H04W 4/021 715/753 |
| 2012/0179981 A1* | 7/2012 | Whalin | G06Q 30/02 715/753 |
| 2012/0277914 A1* | 11/2012 | Crow | H04N 23/695 901/47 |
| 2012/0278704 A1* | 11/2012 | Ying | G06F 40/143 715/243 |
| 2012/0294514 A1* | 11/2012 | Saunders | G06V 20/30 382/218 |
| 2013/0211980 A1* | 8/2013 | Heiferman | G06Q 40/12 705/30 |
| 2013/0212494 A1* | 8/2013 | Heiferman | G06Q 30/02 715/753 |
| 2014/0013217 A1* | 1/2014 | Hashii | G06F 16/958 715/253 |
| 2014/0092424 A1* | 4/2014 | Grosz | G06F 40/186 358/1.15 |
| 2014/0096017 A1* | 4/2014 | Grosz | G06F 3/1272 715/738 |
| 2014/0109046 A1* | 4/2014 | Hirsch | G06F 8/70 717/120 |
| 2014/0193047 A1* | 7/2014 | Grosz | G06Q 10/10 382/118 |
| 2014/0195921 A1* | 7/2014 | Grosz | G06F 3/1205 715/738 |
| 2014/0229462 A1* | 8/2014 | Lo | G06F 16/9038 707/707 |
| 2014/0278998 A1 | 9/2014 | Systrom et al. | |
| 2015/0007132 A1* | 1/2015 | Baldwin | G06F 8/70 717/110 |
| 2015/0019305 A1 | 1/2015 | Gorawala | |
| 2015/0040031 A1* | 2/2015 | Lee | G06F 3/04842 715/748 |
| 2015/0169580 A1 | 6/2015 | Epstein | |
| 2015/0205950 A1 | 7/2015 | Vayvod et al. | |
| 2015/0310520 A1* | 10/2015 | Donato | G06Q 30/0237 705/26.5 |
| 2016/0092935 A1* | 3/2016 | Bradley | G06Q 30/0276 705/14.72 |
| 2016/0224999 A1* | 8/2016 | Mukherjee | G06Q 30/0203 |
| 2016/0234267 A1* | 8/2016 | Hebbar | H04N 21/26258 |
| 2016/0275067 A1* | 9/2016 | Mei | G06F 40/106 |
| 2016/0294762 A1* | 10/2016 | Miller | G06Q 30/0242 |
| 2017/0017371 A1* | 1/2017 | Hundemer | H04N 21/4316 |
| 2017/0056771 A1 | 3/2017 | Davis | |
| 2017/0060509 A1* | 3/2017 | Tulasi | G06F 40/284 |
| 2017/0116179 A1* | 4/2017 | Gagné-Langevin | G06F 40/169 |
| 2017/0139930 A1* | 5/2017 | Maloney | G06F 16/285 |
| 2017/0160904 A1* | 6/2017 | Tene | G06F 3/0482 |
| 2017/0185254 A1* | 6/2017 | Zeng | G06Q 10/101 |
| 2017/0185268 A1* | 6/2017 | Zeng | G06F 3/04842 |
| 2017/0270078 A1* | 9/2017 | Rajwat | G06F 40/106 |
| 2017/0270079 A1* | 9/2017 | Rajwat | G06F 3/04842 |
| 2017/0315683 A1* | 11/2017 | Boucher | G06F 40/205 |
| 2017/0364981 A1* | 12/2017 | Simpson | G06F 16/951 |
| 2018/0018078 A1* | 1/2018 | Hundemer | G06Q 50/01 |
| 2018/0020034 A1* | 1/2018 | Hundemer | H04L 51/52 |
| 2018/0025371 A1* | 1/2018 | Perriman | G06Q 10/02 705/7.31 |
| 2018/0025373 A1* | 1/2018 | Perriman | G06Q 30/0205 705/7.11 |
| 2018/0083894 A1* | 3/2018 | Fung | H04L 51/02 |
| 2018/0114238 A1* | 4/2018 | Treiser | G06Q 30/0204 |
| 2019/0004688 A1* | 1/2019 | Bowen | G06Q 30/0621 |
| 2020/0008652 A1 | 1/2020 | Makino | |
| 2020/0104277 A1* | 4/2020 | Maloney | G06F 40/131 |
| 2020/0104422 A1 | 4/2020 | Crisp et al. | |
| 2020/0159870 A1* | 5/2020 | Bowen | G06F 3/0482 |
| 2020/0159871 A1* | 5/2020 | Bowen | G06T 11/60 |
| 2020/0160612 A1* | 5/2020 | Bowen | G06F 30/20 |
| 2020/0250735 A1 | 8/2020 | Nabers | |
| 2021/0303112 A1 | 9/2021 | Harrison et al. | |

OTHER PUBLICATIONS

Ko, Jane, "How I Create My Instagram Stories (+Free IG Story Templates)", Jul. 30, 2019, A Taste of KOKO Blog (Year: 2019).

Piotrowski, J, et al, "Reading with Hotspots," Jun. 13, 2016, Computers in Human Behavior (Year: 2016).

(56) References Cited

OTHER PUBLICATIONS

Team Hallam, "How to use Hootsuite", Jun. 13, 2017, Hallam Internet (Year: 2017).

Tempest, Quinn, "Later Vs. Planoly: Which Tool Should You Use To Plan Your Instagram?", Jan. 29, 2019, Quinn Tempest Blog (Year: 2019).

Zimmerman, Sue, "How To Schedule Instagram Stories With Planoly 2018 (Plan Ahead so You Can Take a Break)", Dec. 10, 2018, Sue B. Zimmerman Blog (Year: 2018).

FilterGrade Photoshop Actions & Lightroom Presets, retrieved Jun. 25, 2019 from https://filtergrade.com/ ( 4 pages).

Fonts, Graphics, Themes and More-Creative Market, retrieved Jun. 25, 2019 from https://creativemarket.corn/ (2 pages).

Rubinstein M., et al., A Comparative Study of Image Retargeting, retrieved from https://people.csail.mit.edu/mrub/papers/retBenchmark.pdf, 2010, (9 pages).

Schiappa, M., DeepLabv3: Semantic Image Segmentation, Towards Data Science Blog Post, Sep. 23, 2019, retrieved from https://towardsdatascience.corn/deeplabv3-c5c749322ffa on May 21, 2020 (7 pages).

Seam Carving, Wikipedia, retrieved from https://en.wikipedia.org/wiki/Searn_carving May 21, 2020 (8 pages).

* cited by examiner

800

```
{ "template":
    "template_name" : "insta_story",
    "entity_ID" : "E081487",
    "template_page1" :
    {
        "content_type" : "image",
        "page_duration" : 5,
        "image_width" : 320,
        "image_height" : 320,
        "image_filter" : "G2",
        "text" :
        {
            "font" : "neon",
            "size" : 14,
            "color" : "pink",
            "text_rotation" : 30,
        },
    },
    "template_page2" :
    {
        "content_type" : "video",
        "page_duration" : 20,
        "recording_effect" : "superzoom",
        "animation_effect" : "bloom",
        "background_music" :
        {
            "song title" : "shadow",
            "artist" : "lady gaga",
            "excerpt" : "00:30 – 00:50",
        },
        "sticker" : "location"
    },
    "template_page3" :
    {
        "content_type" : "image",
        "page_duration" : 10,
        "image_width" : 300,
        "image_height" : 400,
        "image_filter" : "G3",
        "sticker" : "smile emoji",
    },
}
```

Figure 8

TEMPLATE FOR CREATING CONTENT ITEM

BACKGROUND

The present specification generally relates to a technology for generating templates that can be used to create content items and selectively providing the templates to a user.

Previous solutions for using templates did not create coherent multi-page content presentations and did not provide options for sharing or modifying the templates by an end user. Further, previous templates did not allow management of the templates by owners or creators of the templates, nor did they allow for secure attribution.

SUMMARY

A template creation, sharing, and application system can be configured to perform particular operations or actions by virtue of having software, firmware, hardware, or a combination of them installed on the system that in operation causes or cause the system to perform the actions. One general aspect of the system includes a method that includes: receiving, by a processor, a template list and one or more previews of one or more templates in the template list; displaying, by the processor, the one or more previews of the one or more templates to a user via a graphical interface; receiving, by the processor, from the user via the graphical interface, an input selecting a certain template from among the one or more templates; retrieving, by the processor, a template file describing the certain template; and displaying, by the processor, a content item of the user integrated into the certain template based on the template file.

Some embodiments may include one or more of the following features: receiving, by the processor, from the user via the graphical interface, an input modifying one or more of the content item and the certain template; generating, by the processor, a result content item including modifying the one or more of the content item and the certain template based on the input modifying the one or more of the content item and the certain template; determining, by the processor, the one or more templates of the template list based on a user profile of the user; unlocking, by the processor, the one or more templates for use by the user including determining, from the template list, the one or more templates based on an association of the user profile with the one or more templates in a database accessible to the processor; that determining the one or more templates of the template list based on the user profile of the user includes determining an entity associated with the user profile, and determining the one or more previews of the template list that are associated with the entity; authenticating, by the processor, a user of the user profile; associating, by the processor, the user profile with the entity; and unlocking, by the processor, the one or more templates in the template list for use by the user.

Some embodiments may additionally or alternatively include one or more of the following features: that unlocking the one or more templates in the template list for use by the user includes receiving an activation link identifying an entity, receiving, from the user via the graphical interface, a user input selecting the activation link, and responsive to receiving the user input selecting the activation link, associating the user with the entity; associating, by the processor, the one or more templates with the entity and determining the one or more previews of the template list that are associated with the entity; that the template file describes one or more template pages of the certain template, each template page including one or more content regions organized based on a layout structure; receiving, by the processor, an asset package with the template file, the asset package including one or more media files used in the certain template; receiving, by the processor, user input designating visual aspects of the certain template and the asset package; that displaying the content item of the user integrated into the certain template based on the template file includes inserting multiple content elements into multiple content regions of the certain template; and that displaying the content item of the user integrated into the certain template based on the template file includes inserting each of multiple content elements one of multiple template pages of the certain template.

Other embodiments of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The disclosure is illustrated by way of example, and not by way of limitation in the figures of the accompanying drawings in which like reference numerals are used to refer to similar elements.

FIG. 8 is an example template file.

DESCRIPTION

Figure 1:
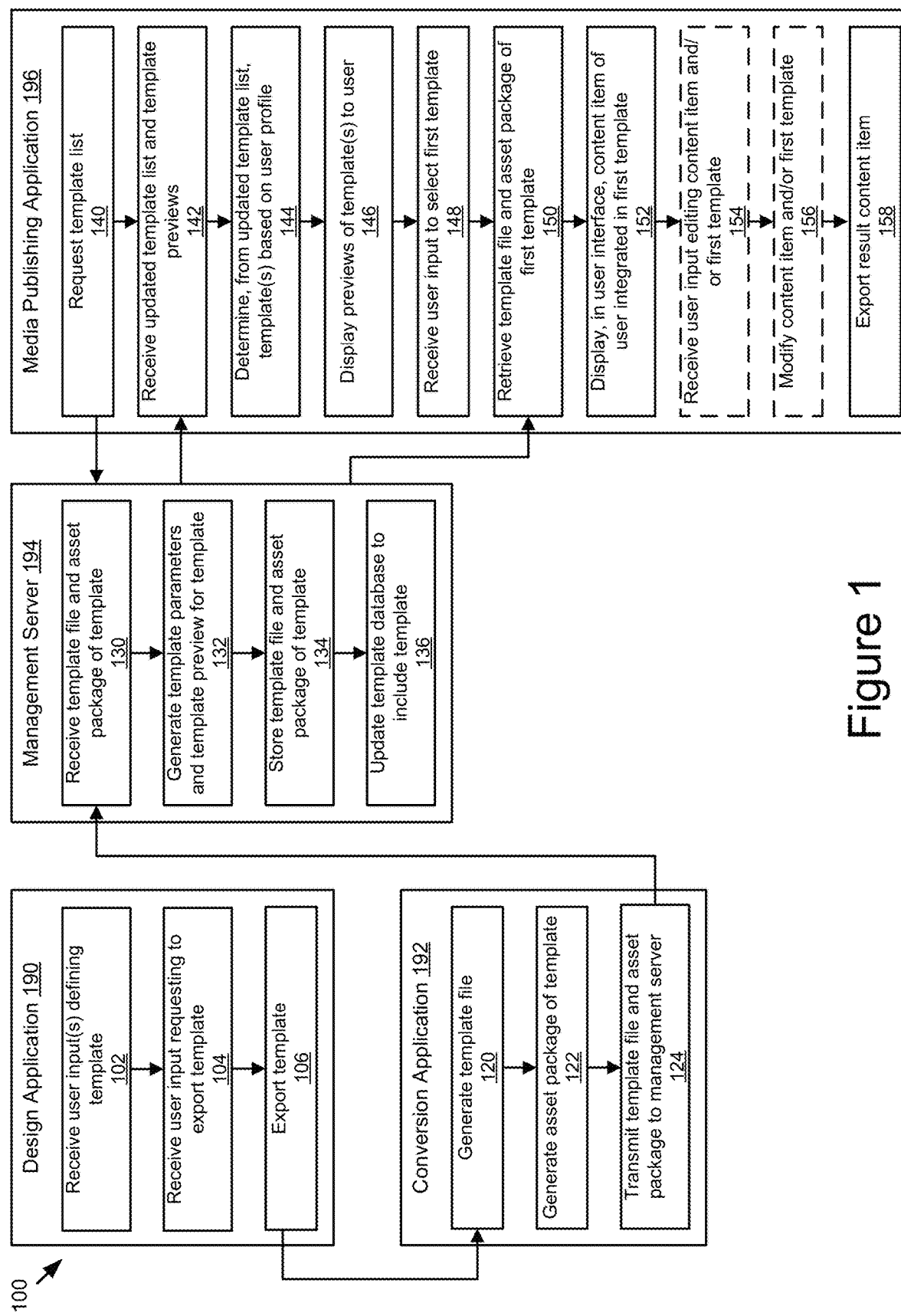
FIG. 1 illustrates an example method for generating, storing, and providing templates that may be used to create or modify content items.

The present specification generally relates to technology for generating templates that can be used to create content items and for selectively providing the templates to a user. The present technology may facilitate creation of content items, such as stories, slideshows, sequences, or other organizations of content elements, such as text, images, videos, or other content or media. For example, the present technology may provide available templates that specify a structure and visual representation of various components of content item to a user device 920. Thus, the present technology can advantageously simplify the process of creating or modifying a content item, for example, in cases where the content item has a complicated structure and/or uses a relatively large amount of editing. For example, the technology may automatically cause each element (also referred to herein as a content element) of a content item to have a different look and feel.

In some embodiments, a first device or application (e.g., a user using a design application 190) may create and export a template, which may be associated with an entity and which may describe a structure and visual representation for a content item. The technology may export the template including generating parameters and a preview for the template, storing a template file and an asset package of the template, and storing the template in the template database (e.g., a database of templates).

In some embodiments, a second user may use the template to create a content item using a media publishing application 196, which may be a social network application, and the media publishing application 196 may request a template list describing a set of templates. The technology may transmit the template list and, in some instances, previews of its templates to a user device 920 of the second user, determine a subset of templates from the list based on the user profile of the second user, and display previews of the subset of templates on the user device 920 of the second user. In some embodiments, the media publishing application 196 or another device used by the technology may lock (e.g., for editing, access, or use), unlock, or provide attribution for the template based on ownership, creator identification, association, or user action. In some instances, the media publishing application 196 may receive an input from second user selecting a first template from the subset of templates, in response to which the media publishing application 196, or another component, may transmit the template file and the asset package of the first template to the user device 920 of the second user and import or display the content item of the second user in the first template. In some embodiments, the second user may then interact with a user interface provided by the media publishing application 196 to modify the content item and/or components of the first template in which the content item is integrated and, in some instances, export the modified content item. The media publishing application 196 may also export the modified content item.

The features and advantages described herein are not all-inclusive and many additional features and advantages will be apparent to a person of ordinary skill in the art in view of the figures and description. Also, it should be noted that the language used in the specification has been selected for readability and instructional purposes and not to limit the scope of the inventive subject matter.

With reference to the Figures, reference numbers may be used to refer to components found in any of the figures, regardless whether those reference numbers are shown in the Figures being described. Further, where a reference number includes a letter referring to one of multiple similar components (e.g., component 000a, 000b, and 000n), the reference number may be used without the letter to refer to one or all of the similar components.

FIG. 1 illustrates an example method 100 for generating, storing, and providing templates that may be used to create or modify content items. In some embodiments, the method 100 may be performed by a management server 194, a design application 190, a conversion application 192, and/or a media publishing application 196 that are implemented on one or more computing devices (e.g., 920 or 1000). It should be understood that each of these applications may fully or partially perform the functionalities described herein and that their functionalities may be condensed to fewer devices or distributed differently.

In some embodiments, a user (e.g., a graphic designer) may create a template using the design application 190. As discussed elsewhere herein, a template may stipulate a structure or organization of a content item as well as the visual representation of various components in the content item. In block 102, the design application 190 may receive inputs from the user defining the template. In some embodiments, the template may include one or more pages, segments, or portions, each of which may correspond to or display an individual element of the content item. A template page may be a page into which one or more content items or elements of content items may be inserted, integrated, or displayed. For example, a template page may include one or more slots, content regions, areas, or objects into which content items or elements thereof may be inserted. Each template page may have different visual aspects, organization, or details and may be applied to different content types (e.g., an image, video, text, etc.). For example, a content item may include multiple content elements (e.g., images, videos, text, etc.) that may be automatically displayed in sequence or arrangement using a template when the content item is displayed. The user may provide various user inputs to design the visual aspects and/or define other display parameters (e.g., order, duration, background music, etc.) for each template page of the template.

Figure 5:
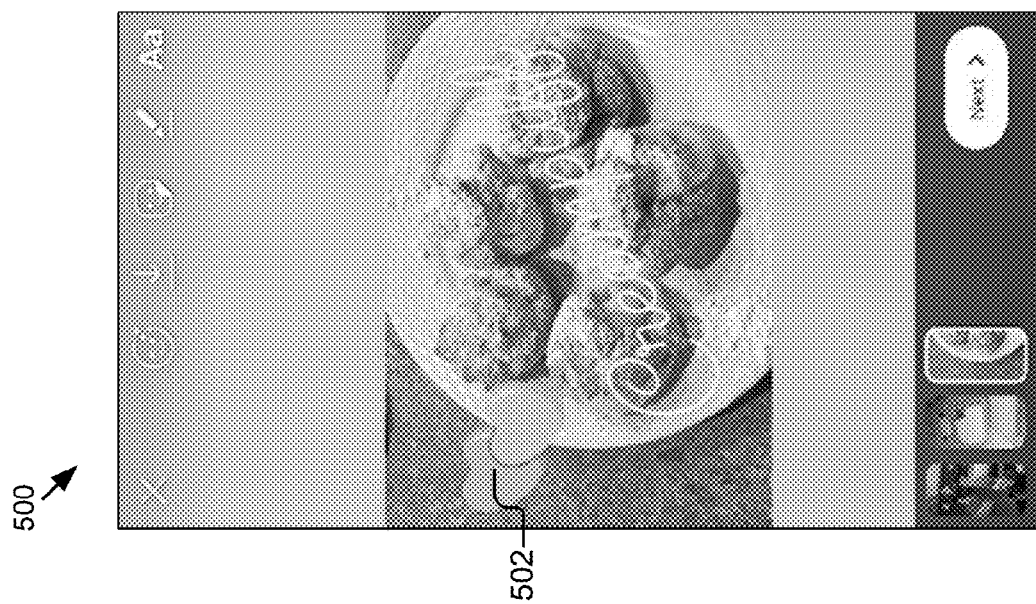
FIGS. 3-7 are illustrations of example graphical user interfaces for creating and applying templates to content.
Figure 4:
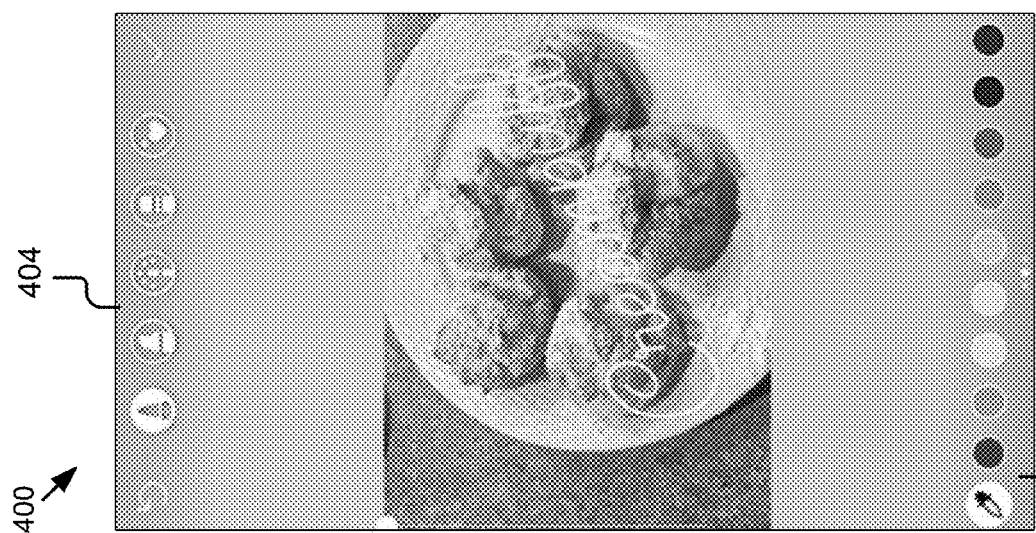
Figure 3:
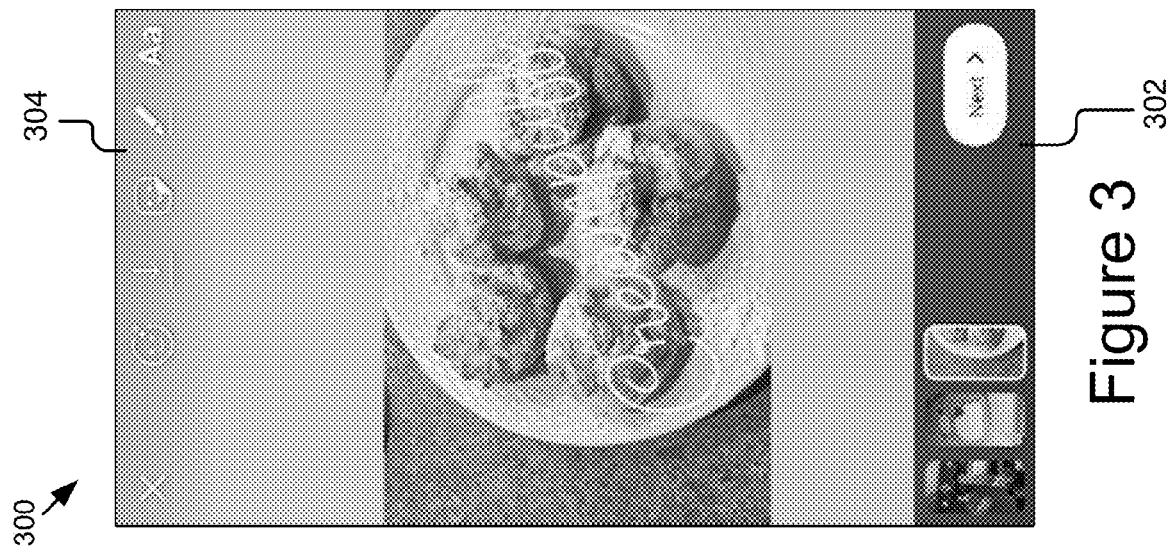

For example, as depicted in the user interfaces 300, 400, and 500 in FIGS. 3-5, the design application 190 may include a text field in a template page and receive input from the user defining a text format, include a sticker(s) in a template page, or otherwise customize a template page(s), etc., using various editing tools provided in the user interfaces to design the template. For instance, as illustrated in FIG. 3, the design application 190 may allow a user to add template pages at graphical element 302 and various text, stickers, or other items at graphical element 304. As illustrated in FIG. 4, the design application 190 may display an ink modification graphical element 402 that can be used to modify visual aspects of the template page or template, such as a text color, background color, or image filter. The design application 190 may display a text modification graphical element 404 using which a user may modify the appearance of text or other visual aspects of the template. FIG. 5 illustrates a sticker 502 that is overlaid over an image on the template page. For instance, when a user applies the template page to a new image, the sticker 502 may be overlaid over the new image.

In block 104, the design application 190 may receive an input from the user requesting to export the template and, at block 106, the design application 190 may export the template. For example, the design application 190 may generate a sketch file describing the template, and transmit the sketch file to the conversion application 192.

In block 120, the conversion application 192 may generate a template file for the template based on the sketch file of the template. In some embodiments, the template file may describe the structure of the template and/or its template page(s). The template file may describe one or more objects or content regions in a template page, a layout structure in which the objects or content regions are organized in the template page, and/or other display parameters of the template page. The template file may also include a name or title of the template, the entity identifier (ID) of the entity that owns, created, has an entity connection with, or is otherwise associated with the template, and/or other data attributes.

In some embodiments, the template file may be generated in the form of a structured data file in which various data attributes of the template file are organized in a predefined format. In some embodiments, the template file may conform to a structured data file format such as JSON (JavaScript Object Notation), XML (Extensible Markup Language), CSV (Comma Separated Value), etc. In some embodiments, to generate the template file for the template, the conversion application 192, or another component of the system, may aggregate the parameters of the template pages (e.g., object size, object position, content region size and position, text format, duration that a page is set to be displayed, content type of content element to be incorporated into the template page, etc.), and organize these parameters and/or other data attributes of the template pages based on the predefined format of the template file.

An example template file 800 is illustrated in FIG. 8. In the depicted example, the template file 800 may include a "template_name" attribute indicating a name or title of the template (e.g., insta_story), an "entity_ID" attribute indicating an entity identifier (ID) of an entity that owns, created, has an entity connection with, or is otherwise associated with the template (e.g., E081487). For example, the template may include 3 template pages displayed in sequential order. As illustrated, for the first template page, the template file 800 may include a "template_page1" attribute describing the first template page. The "template_page1" attribute may include a "content type" attribute describing a type of a content element to be incorporated into a template page (e.g., an image, video, text element, etc.), and a "page duration" attribute describing a time period during which the template, a template page, and/or a content item/element placed in the template is displayed (e.g., 5 seconds). In instances where a content element displayed in a template page is an image, the "template_page1" attribute may include an "image width" attribute and an "image height" attribute indicating the size of the image (e.g., 320×320 pixels). An "image filter" attribute may indicate an image filter applied to the image (e.g., G2). A "text" attribute may describe a format of the text inserted into the image, such as a font (e.g., neon), size (e.g., 14), color (e.g., pink), text rotation (e.g., 30°), etc. The template file may additionally or alternatively include other visual aspects or effects applied to a content item by a template or template page.

Similarly, in some embodiments, the template file may include attributes, objects, content regions, visual aspects, etc., for multiple template pages and, in some instances may indicate that a template includes a certain quantity of pages. For example, for a second template page, a "template_page2" attribute may include a "content type" attribute (e.g., video) and a "page_duration" attribute (e.g., 20 seconds). For example, when a content element displayed in the second template page a certain type, the design application 190 or conversion application 192 may automatically include various attributes in the template file. For instance, if the template page is or includes a video, the "template_page2" attribute may include a "recording effect" attribute describing a recording effect applied to a video (e.g., superzoom), an "animation effect" attribute describing an animation effect applied to a video (e.g., bloom), and a "background music" attribute describing music played during a video, such as a song title (e.g., shadow), artist (e.g., Lady Gaga), excerpt (e.g., 00:30-00:50), a music file, etc., a "sticker" attribute describing a sticker inserted into the video (e.g., indicating a location at which the video is captured, an emotion, a subject matter, etc.), and/or other visual effects applied to a second template page.

In some embodiments, as illustrated in the template file 800 for a third template page, the "template_page3" attribute may include a "content type" attribute (e.g., image) and a "page_duration" attribute (e.g., 10 seconds). For example, for an image content type, the design application 190 or conversion application 192 may insert, in the template file 800 for the "template_page3" attribute, an "image width" attribute and an "image height" attribute (e.g., 300×400 pixels), an "image filter" attribute (e.g., G3), a "sticker" attribute (e.g., a smile emoji), and/or other visual effects applied using the third template page. For example, a content item incorporated using the template may include a first image displayed during the first 10 seconds in the first template page, a video displayed during the next 20 seconds in the second template page, and a second image displayed during the next 10 seconds in the third template page, for instance, where the 3 template pages of the template are specified in the template file 800.

In block 122, the conversion application 192 may generate an asset package of the template based on the sketch file of the template. The asset package may include component files of the template's attributes, components, etc., used in the template, such as images, icons, fonts, and so forth. For example, the asset package may include the component files of the "neon" font, the sticker "location," the sticker "smile emoji," the "superzoom" recording effect, the "bloom" animation effect, the excerpt audio of the song "shadow," etc. In some embodiments, the conversion application 192 may compress the asset package of the template to reduce the data size of the asset package, thereby facilitating the transmission of the asset package to other computing entities.

In some embodiments, the conversion application 192 and the design application 190 may be combined or the functionality may be otherwise distributed. In some embodiments, the design application 190 and/or conversion application 192 may be web applications executed via a web browser, a smartphone application, and/or use operations performed in full or in part by the management server 194, although other embodiments are possible. For example, instead of exporting the sketch file and transmitting the sketch file to the conversion application 192, the design application 190 may generate the template file and the asset package for the template and output the template file and the asset package of the template. In some embodiments, in block 124, the conversion application 192 may transmit the template file and the asset package of the template to a management server 194.

In some embodiments, in block 130, the management server 194 may receive the template file and the asset package of the template from the conversion application 192. In block 132, the management server 194 may generate one or more parameters and/or a preview for the template based on the template file and the asset package. In some embodiments, the parameters may indicate metadata of the template and may be used to index or search for the template in a template database. Examples of the parameters include, but are not limited to, a template ID uniquely identifying the template, a name (e.g., insta_story), a size (e.g., Instagram story format), a number of template pages in the template (e.g., 3), a category tag indicating a category of the template (e.g., food and restaurant, vacation, selfie, etc.), an asset parameter indicating whether the template has an asset package, an entity connection indicating an entity that owns, created, manages, or is otherwise associated with the template (e.g., Instasize), etc. In some embodiments, the management server 194 may also generate a preview for the template using the template file and the asset package. In some instances, the preview may include a thumbnail, such as a miniature image that provides a preview of the template or an application thereof (e.g., to a content item/content elements) for display to a user, thereby facilitating the template selection of the user.

In block 134, the management server 194 may store the template file, the asset package, the parameters/attribute values, and/or a template preview of the template in a data store of the management server 194 and/or in that of a third-party cloud server accessible to one or more of the components 190, 192, 194, and 196. In block 136, the management server 194 may update the template database to include the template. In some embodiments, the management server 194 may index the templates in the template database based on one or more parameters of the templates, such as template ID, category tag, content type, or entity connection, etc.

In some embodiments, a user of the media publishing application 196 may assist a user to create or modify a content item. A content item may include multiple content elements that are displayed in sequence or other arrangement when the content item is selected or presented for display. In some instances, the media publishing application 196 may include or interact with a social network using which the user may create and/or share a content using a template. In some embodiments, the media publishing application 196 may automatically remove the content item from a social network page of the user after a defined time period has lapsed since the publication of the content item (e.g., 24 hours).

In some embodiments, in block 140, the media publishing application 196 (e.g., executed on a user device 920 of a user) may transmit a request for template list to the management server 194. Responsive to receiving the request for a template list, the management server 194 may transmit an update-to-date template list including a set of one or more templates in the template database and/or previews of the set of templates to the media publishing application 196.

In block 142, the media publishing application 196 may receive the updated template list and/or the template previews of the templates in the template list and, in block 144, the media publishing application 196 may determine (e.g., for selection and/or display) one or more templates from the template list based on a user profile of the user, an identification of the instance of the media publishing application 196, a cookie or token saved to the user device 920 of the user, etc. For instance, the media publishing application 196 may determine one or more entities associated with the user based on the user profile of the user and determine one or more templates in the template list that belong to, are associated with, or are unlocked for use, viewing, or editing by these entities. Example embodiments for determining which templates are associated with or unlocked to a user are described in further detail herein, for example, in reference to the example operations described in reference to FIGS. 2A and 2B.

In block 146, the media publishing application 196 may display previews of the one or more templates determined from the template list to the user and, in block 148, the media publishing application 196 may receive a user input selecting a first template from among the one or more templates via a user interface displayed by the media publishing application 196 on the user device 920.

In some embodiments, in block 150, the media publishing application 196 may retrieve the template file and the asset package of the first template from the management server 194. For example, the media publishing application 196 may transmit a request for the first template to the management server 194. Responsive to receiving the request for the first template, the management server 194 may retrieve the template file and the asset package of the first template from data storage and transmit the template file and the asset package of the first template to the media publishing application 196.

In block 152, the media publishing application 196 may display the content item of the user, for example, integrated into the first template based on the template file and the asset package of the first template thereby creating, for example, a story, sequence, or other arrangement of content elements. In some embodiments, the user may begin preparing or import a new content item and/or elements of a content item using the media publishing application 196. The media publishing applications 196 may import content elements of the content item for the user into first template, for example, using attributes of the content file. For instance, the media publishing application 196 may identify elements of the content imported by the user, such as an image, location, video, etc., for example, based on metadata of the content elements, file type, user selection, or other factors. The media publishing application 196 may automatically insert the content elements into content regions in the template and/or template pages based on corresponding types or metadata. For example, the media publishing application 196 may identify an image content element, identify a template page with a content region associated with an image (e.g., a the file type or region association is for an image), insert the image into the content region in the template page, and apply the attributes (e.g., filters, stickers, borders, audio clip, display duration, etc.) indicated in the template file to the image.

For example, the media publishing application 196 may identify a video associated with the image (e.g., in subject matter, location captured, time captured, user selection, etc.) and include the video in a subsequent template page of the template, based on the template file. Accordingly, using user inputs and/or automated matching, the media publishing application 196 may apply the template to the content elements to create or modify a content item. For instance, the template may allow a user using a media publishing application 196 to organize together several content elements (e.g., images, videos, text, audio, etc.) into a content item, which may be a story, sequence, collage, or other organization of one or more content elements. In some instances, the template may be applied to a set of content elements or a previously created content item to modify them or it to have a different look and feel (e.g., of the newly applied template).

In some embodiments, once the media publishing application 196 incorporates the content item into the first template, the media publishing application 196 may allow the user to further edit or modify the content item, content elements, objects, attributes, or components, etc., of the template. For example, in block 154, the media publishing application 196 may optionally receive one or more user inputs to modify the content item and/or the selected template and, in block 156, the media publishing application 196 may modify the content item and/or the first template based on the one or more user inputs of the user to generate a result content item.

In some embodiments, in block 158, the media publishing application 196 may receive a user input and accordingly export the result content item. In some instances, a user may select an option from a user interface provided by the media publishing application 196 to save the result content item to a data store, insert it into a document, upload it to a website, or post it to a social network page, etc.

Figure 7:
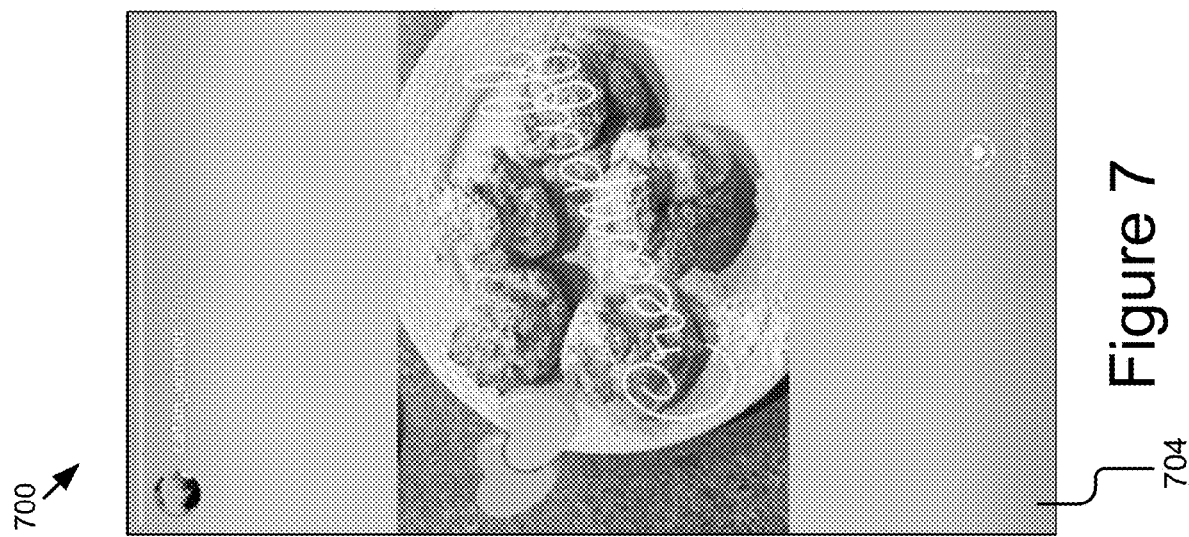
Figure 6:
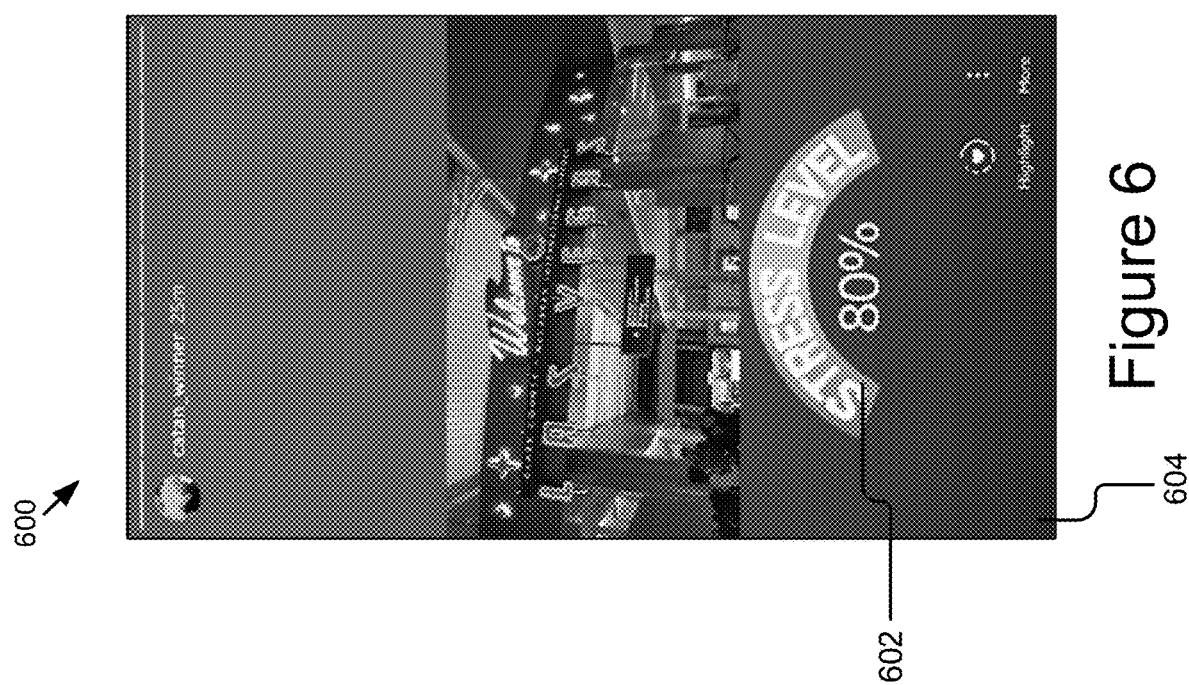

FIGS. 6 and 7 illustrate example content element 600 and example content element 700, which may represent content items of a result content item. For instance, elements 600 and 700 may be among 7 content elements of a result content item (e.g., if a template has 7 template pages). For example, the content element 600 may be a video and content element 700 may be a static image. As depicted, these content elements may have different visual appearances because they have been incorporated using different template pages with differing attributes. In some implementations, the template may indicate a color scheme, such as the browns and cremes illustrated in FIGS. 6 and 7. In some implementations, the color, darkness, or saturation of a color of an image filter, text, sticker, border, or other visual aspect of a template or template page may be consistently applied across pages or may be dynamic based on user input. As illustrated in FIGS. 6 and 7, the template pages may include a consistent color scheme, for example, of a border or background 604 and 704 in multiple template pages of a template. In some instances, a template page may include an interaction element 602 that a user may use to adjust a setting (e.g., a value of a "stress level" may be adjusted to 80%). In some implementations, the media publishing application 196 may automatically adjust a depth, darkness, color, or saturation of the background 604 based on a value of the interaction element 602. For instance, while the backgrounds 604 and 704 are in the same color scheme, the media publishing application 196 has darkened the background 604 based on the value of the interaction element 602 in the depicted example.

Figure 2A:
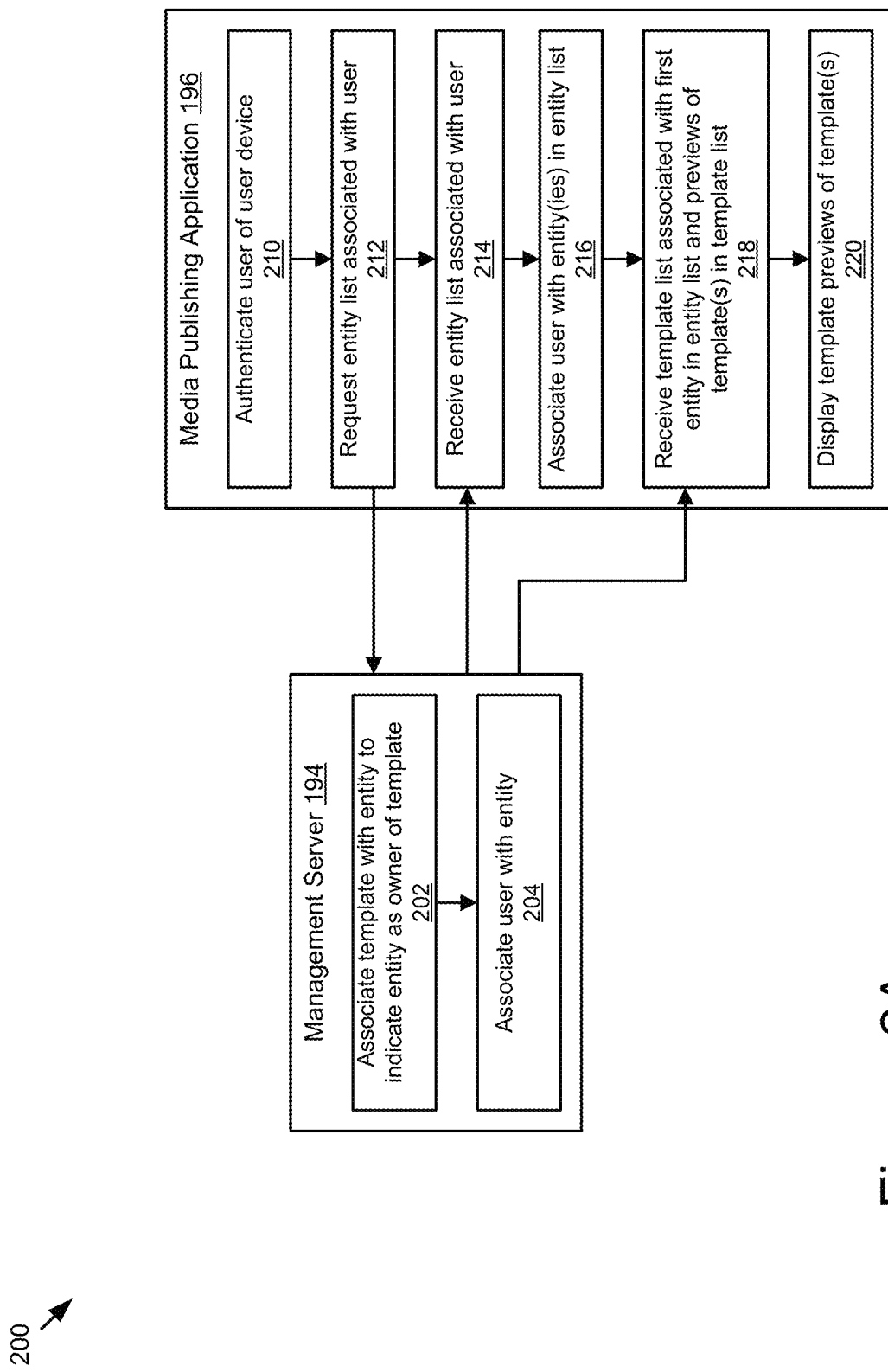
FIGS. 2A and 2B illustrate example methods for unlocking a template for a user.

FIG. 2A illustrates an example method 200 for unlocking a template for a user, user device 920, or instance of the media publishing application 196, for example, based on an entity that has an entity connection (e.g., owns, created, manages, or is associated) with the template and, in some instances, one or more permissions thereof. In some embodiments, the management server 194 may maintain an entity database identifying one or more entities (e.g., organizations, companies, individuals, accounts, etc.). In block 202, the management server 194 may associate a particular template with an entity in the entity database to indicate an entity connection with the template. In some embodiments, the management server 194 may receive the template file of the template from the conversion application 192, analyze the template file, determine an entity with an ownership, attribution, permission, etc., based on the template file or other record, and associate the template with the entity.

In block 204, the management server 194 may additionally or alternatively associate one or more users (e.g., a user profile, account, or user device 920) with the entity and/or template. For example, the management server 194 may associate the user with the entity when a user registers or authenticates as a member of the entity or otherwise obtains permission from the entity to use its templates. Other scenarios for associating a template with the entity or associating a user with the entity are also possible and contemplated.

In some embodiments, in block 210, the media publishing application 196 (e.g., executed on or accessible via a user device 920) may authenticate a user of the user device 920 (e.g., using a username, password, biometric data, token, etc.). In block 212, the media publishing application 196 may request an entity list associated with the user from the management server 194, in some instances, when the user, user device 920, and/or media publishing application 196 is successfully authenticated.

In block 214, the media publishing application 196 may receive the entity list from the management server 194. For instance, an entity list may include data identifying one or more entities associated with the user, template, or account, etc. In some embodiments, in block 216, the media publishing application 196 may associate the user (e.g., an account, user ID, or instance of the media publishing application 196) with an entity(ies) in the entity list, for example, to identify a connection of the user with the template(s) and/or one or more entities.

In some embodiments, in block 218, the media publishing application 196 may retrieve or receive a template list and, in some instances, its template previews, template files, asset package, or other data associated with the template list. For example, the media publishing application 196 may request a template list associated with one or more entities with which the user is associated from the management server 194. In some instances, the template list may include one or more templates that have an entity connection with the entity(ies) with which the user is associated.

In block 220, the media publishing application 196 may display the template previews of the templates in the template list on the user device 920. For example, a user associated with a certain entity may view and, in some instances, select and apply a template belonging to a certain entity to a content item of the user.

Figure 2B:
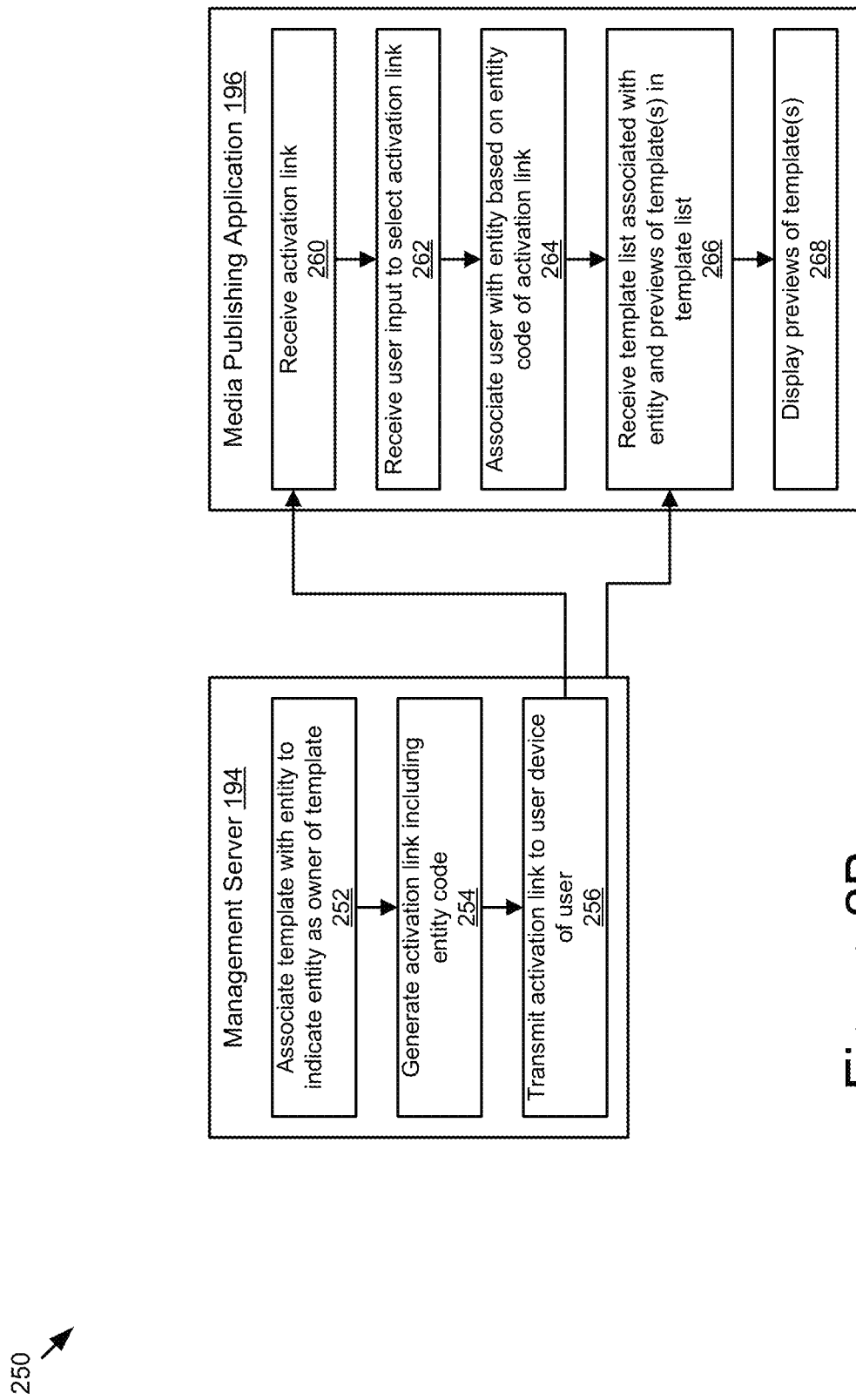

FIG. 2B illustrates another example method 250 for unlocking a template for the user based on an entity connection with the template. Similar to block 202 of the method 200 in FIG. 2A, in block 252, the management server 194 may associate a particular template with an entity in the entity database to indicate the entity as having an entity connection with the template.

Figure 11:
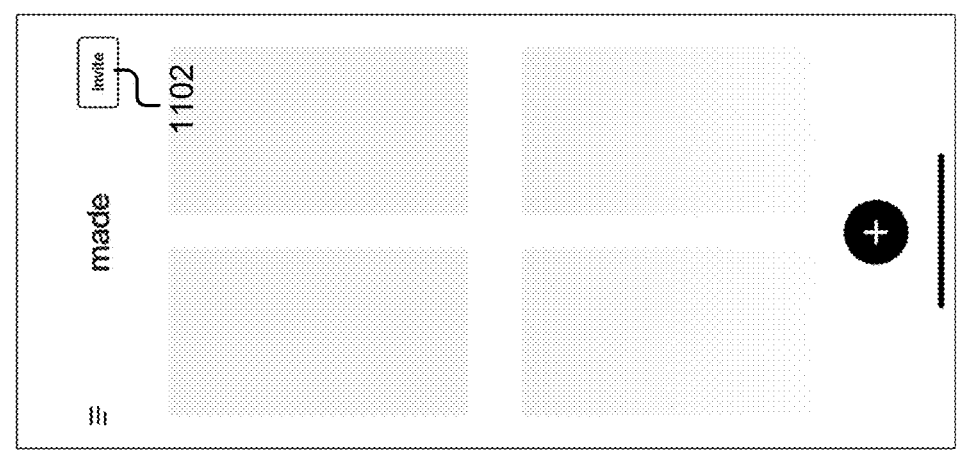

In block 254, the management server 194 may generate an activation link or file including a unique entity code identifying a first entity and, in block 256, the management server 194 may transmit the activation link or file to the user device 920 of the user. The activation link may allow a user on an instance of the media publishing application 196 to use a template file, for example, by facilitating an association of the user with an entity, unlocking, or decrypting the template file. In some instances, the management server 194 may generate the activation link in response to receiving a request of a user (e.g., an administrator, content creator, owner, etc.) via an instance of the design application 190, conversion application 192, management server 194, or media publishing application 196. For example, as depicted in in FIG. 11, a user (e.g., an administrator of an entity) may select an option to "Invite" (e.g., via the graphical element 1102) in the user interface 1100 provided by an instance of the media publishing application 196. The media publishing application 196 may then receive an input from the user selecting one or more other users to which to send the activation link. It should be understood that other embodiments for transmitting the activation link to the user device 920 of the user are also possible and contemplated, such as by generating and sending or displaying a QR (quick reference) code, file, SMS or MMS message, etc.

Figure 12:
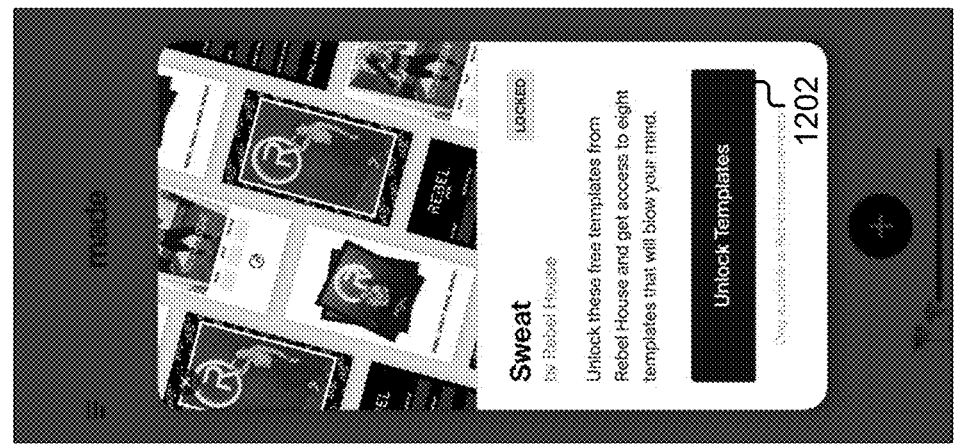

In some embodiments, in block 260, a receiving instance of the media publishing application 196 (e.g., executed on a user device 920 of a receiving user) may receive the activation link. The media publishing application 196 may display the activation link to the user via a user interface on the user device 920, and the user may select the activation link. For example, FIG. 12 depicts a user interface 1200 displayed on the user device 920 of the user. As depicted, the user interface 1200 may indicate that a template (e.g., associated with a particular entity) is currently "locked" for the user. In the depicted example, the activation link may be represented by the option "Unlock Templates" (e.g., graphical element 1202) and, by selecting the option "Unlock Templates," the user can unlock the template(s). For instance, in block 262, the media publishing application 196 may receive a user input to select the activation link via the user interface 1200. Responsive to receiving the user input, the media publishing application 196 may associate the user with the first entity based on the entity code of the activation link in block 264. In some embodiments, the user may perform certain actions for unlocking the templates or creating an entity connection with the template via the media publishing application 196 or other communication with the management server 194 (e.g., via a web browser). For instance, the user may join a mailing list, purchase access to a template list, watch an advertisement, or perform another action, which may cause the management server 194 to store an association or key providing access to the template(s) to the user, account, user device 920, or instance of the media publishing application 196.

Figure 13:
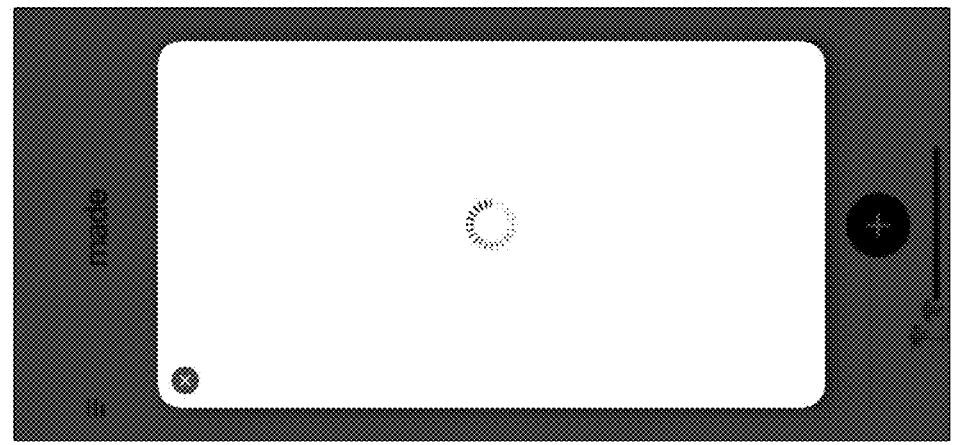
FIGS. 11-16 are illustrations of example graphical user interfaces for applying templates to content.
Figure 14:

In some embodiments, the media publishing application 196 may request a template list that includes one or more templates associated with the first entity in a data store, for example, accessible to the management server 194. In block 266, the media publishing application 196 may receive the template list associated with the first entity and, in some instances, previews of the template(s) in the template list. For example, FIG. 13 illustrates a waiting user interface 1300 that is displayed on the user device 920 while processing is performed to associate the first entity with the user and/or to retrieve the template list and previews from the management server 194. Once processing is completed, the user device 920 may display an example user interface 1400 illustrated in FIG. 14. As depicted, the user interface 1400 may indicate that the templates associated with the first entity are now "unlocked" or activated for the user, and thus these templates are available for user to apply for a content item. For example, the user interface 1400 may include an option 1402 to create a content item, such as a story, slideshow, collage, or other arrangement of content elements.

In block 268, the media publishing application 196 may display template previews of the templates in the template list to the user on the user device 920. Thus, the user may be provided with one or more templates associated with or belonging to the first entity to apply to the content item of the user.

Figure 16:
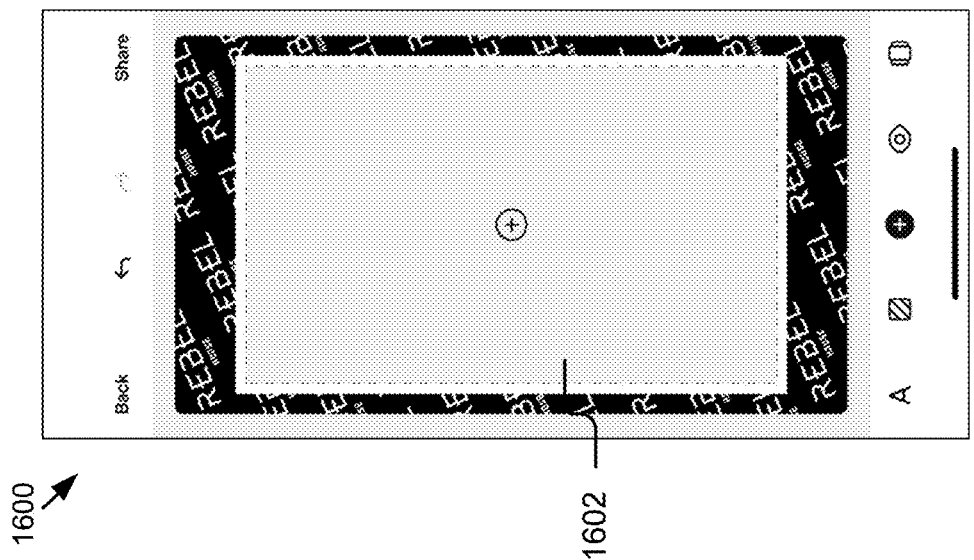
Figure 15:
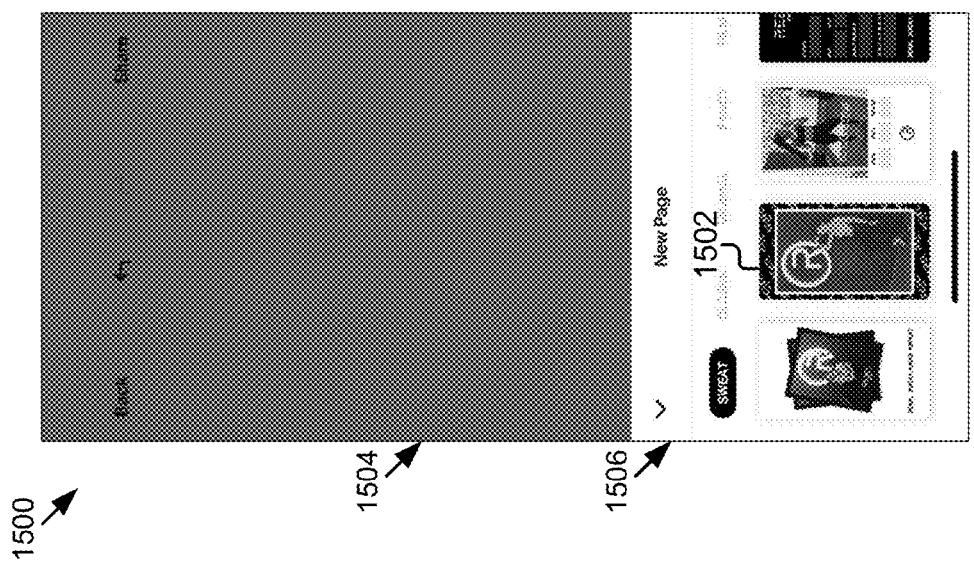

For example, FIG. 15 depicts an example user interface 1500 for the user to apply a template for a content item. The user interface 1500 may include a content region 1504 and a template preview region 1506 with one or more thumbnails or template previews 1502, for example, overlaid over the content region 1504. As illustrated, a set of template pages for a "Sweat" template may be displayed in the template preview region 1506. For instance, one or more templates (e.g., sweat, classic, minimal, fancy, film, etc.) may be unlocked or activated for the user, and available in the user interface 1500 for the user to apply to the content elements or a content item. For example, the user may select a template page represented by the preview 1502 to apply to the content element. As depicted in FIG. 16, the selected template page of a template may then be displayed with a content region 1602 into which a content element (e.g., an image) may be integrated. The user may interact with the content region 1602 to add a content element. In some instances, the user may additionally add one or more additional content elements to other template pages of the template using the interfaces 1500 and 1600 to create a content item, such as a story or sequence of content elements based on the template (e.g., "Sweat").

Figure 9:
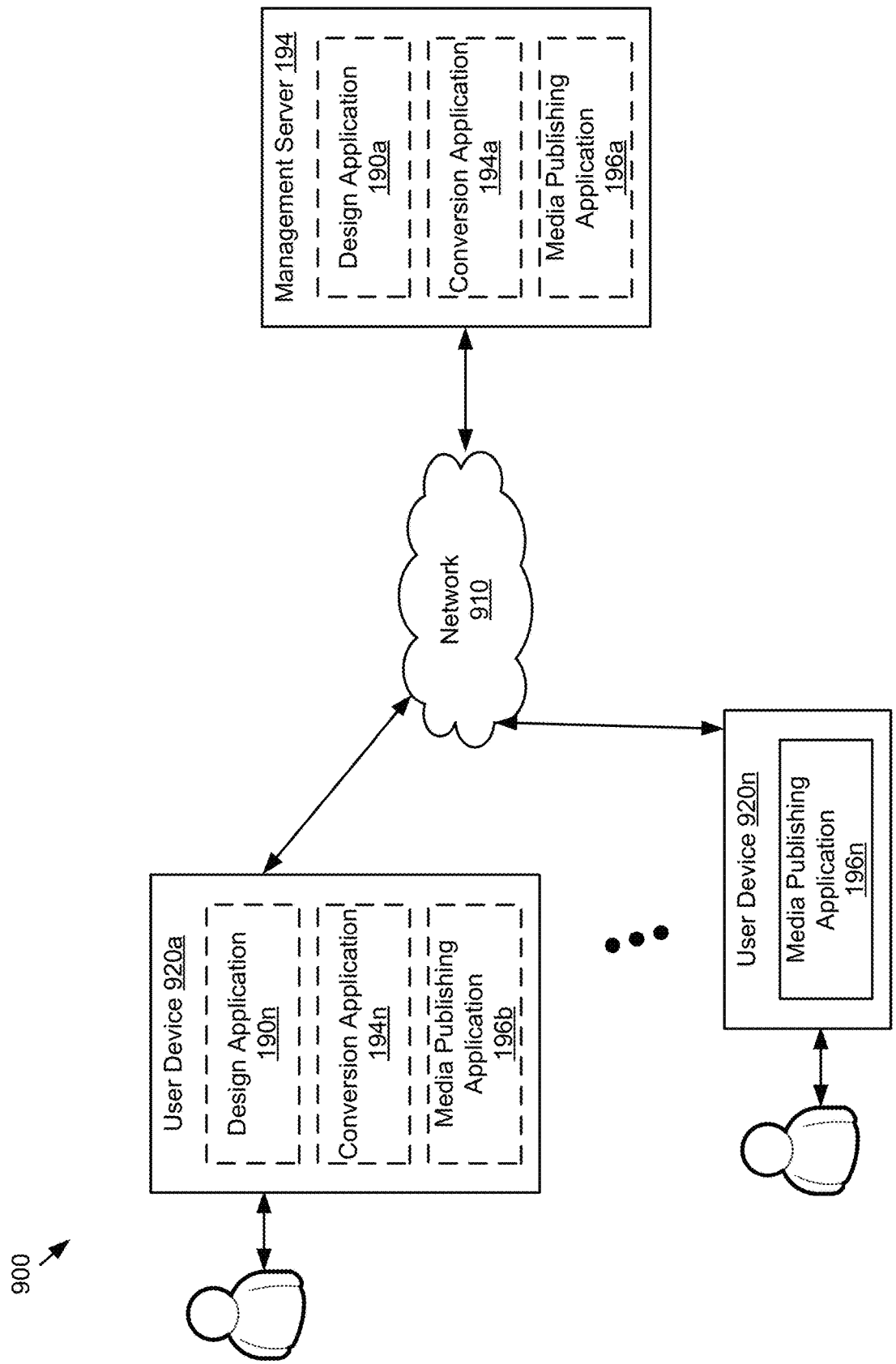
FIG. 9 is a block diagram of an example system and data communication flow for creating, sharing, and using templates.

As depicted in FIG. 9, the illustrated computing system 900 for generating templates, providing templates to users, and applying templates to content items of the users may include user device(s) 920*a* . . . 920*n* (also referred to herein individually and/or collectively as 920), and management server(s) 194, which are electronically and communicatively coupled via the network 910 for interaction with one another, although other system configurations are possible including other devices, systems, and networks. For example, the computing system 900 may include any number of user devices 920, management servers 194, third-party servers (not shown) and other systems and devices. The user devices 920*a* . . . 920*n*, and their components, may be coupled to the network 910. The management server 194 and its components may also be coupled to the network 910. The user devices 920 and the management server 194 depicted in FIG. 9 only include one or more of the design application 190*a* . . . 190*n*, the conversion application 190*a* . . . 190*n*, and the media publishing application 196*a* . . . 196*n*. In some instances, these applications implemented on these computing entities may interact with one another to collaboratively perform the functionalities described herein. In some embodiments, the user devices 920 may include a smartphone, laptop, desktop computer, or other computing device.

The network 910 may include any number of networks and/or network types. For example, the network 910 may include one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The management server 194 may have data processing, storing, and communication capabilities, as discussed elsewhere herein. For example, the management server 194 may include one or more hardware servers, server arrays, storage devices and/or systems, etc. In some embodiments, the management server 194 may include one or more virtual servers, which operate in a host server environment. As depicted, the management server 194 may include the design application 190, the conversion application 192, the media publishing application 196, etc., as discussed elsewhere herein. The management server 194 may also host other services such as a third-party application (not shown), which may be individual and/or incorporated into the services provided by the management server 194.

Figure 10:
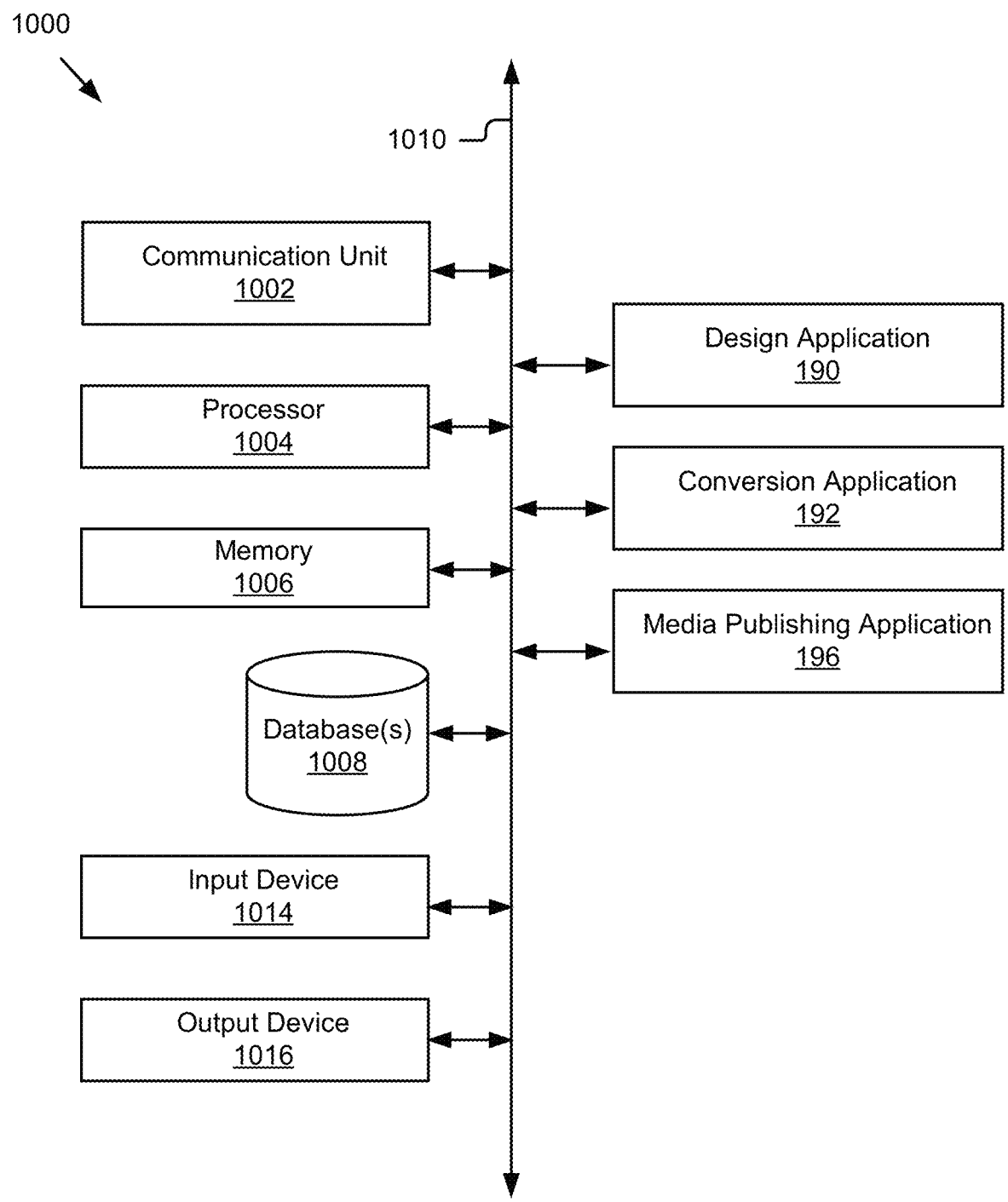
FIG. 10 is a block diagram illustrating an example computing device.

FIG. 10 illustrates a computing device 1000 that can be implemented as the user device 920 or the management server 194, for example. As depicted, the computing device 1000 may include a communication unit 1002, a processor 1004, a memory 1006, database(s) 1008, an input device 1014, an output device 1016, the design application 190, the conversion application 192, and the media publishing application 196 which may be communicatively coupled by a communication bus 1010. The computing device 1000 depicted in FIG. 10 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing device 1000 may include various operating systems, sensors, additional processors, and other physical configurations. Although, for purposes of clarity, FIG. 10 only shows a single communication unit 1002, processor 1004, memory 1006, etc. It should be understood that the computing device 1000 may include a plurality of one or more of these components.

The processor 1004 may execute software instructions by performing various input, logical, and/or mathematical operations. The processor 1004 may have various computing architectures to method data signals including, for example, a complex instruction set computer (CISC) architecture, a reduced instruction set computer (RISC) architecture, and/or an architecture implementing a combination of instruction sets. The processor 1004 may be physical and/or virtual, and may include a single core or plurality of processing units and/or cores. In some embodiments, the processor 1004 may be capable of generating and providing electronic display signals to a display device, supporting the display of images, capturing and transmitting images, performing complex tasks including various types of feature extraction and sampling, etc. In some embodiments, the processor 1004 may be coupled to the memory 1006 via the bus 1010 to access data and instructions therefrom and store data therein. The bus 1010 may couple the processor 1004 to the other components of the computing device 1000 including, for example, the communication unit 1002, the memory 1006, the input device 1014, the output device 1016, and the database(s) 1008.

The memory 1006 may store and provide access to data to the other components of the computing device 1000. The memory 1006 may be included in a single computing device or a plurality of computing devices. In some embodiments, the memory 1006 may store instructions and/or data that may be executed by the processor 1004. For example, the memory 1006 may store an instance of the design application 190, the conversion application 192, the media publishing application 196, and their respective components, depending on the configuration. The memory 1006 is also capable of storing other instructions and data, including, for example, an operating system, hardware drivers, other software applications, databases, etc. The memory 1006 may be coupled to the bus 1010 for communication with the processor 1004 and the other components of the computing device 1000.

The memory 1006 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 1004. In some embodiments, the memory 1006 may include one or more of volatile memory and non-volatile memory (e.g., RAM, ROM, hard disk, optical disk, etc.). It should be understood that the memory 1006 may be a single device or may include multiple types of devices and configurations.

The bus 1010 may include a communication bus for transferring data between components of a computing device or between computing devices, a network bus system including the network 910 or portions thereof, a processor mesh, a combination thereof, etc. In some embodiments, the management server 194, the design application 190, the conversion application 192, the media publishing application 196, and various other components operating on the computing device 1000 (operating systems, device drivers, etc.) may cooperate and communicate via a communication mechanism included in or implemented in association with the bus 1010. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 1002 may include one or more interface devices (I/F) for wired and wireless connectivity among the components of the system 900. For example, the communication unit 1002 may include various types known connectivity and interface options. The communication unit 1002 may be coupled to the other components of the computing device 1000 via the bus 1010. The communication unit 1002 may be electronically communicatively coupled to the network 910 (e.g., wiredly, wirelessly, etc.). In some embodiments, the communication unit 1002 may link the processor 1004 to the network 910, which may in turn be coupled to other processing systems. The communication unit 1002 may provide other connections to the network 910 and to other entities of the computing system 900 using various standard communication protocols.

The input device 1014 may include any device for inputting information into the computing device 1000. In some embodiments, the input device 1014 may include one or more peripheral devices. For example, the input device 1014 may include a sensor, a keyboard (e.g., a virtual keyboard), a pointing device (e.g., a virtual mouse device), a microphone for receiving user input via speech, an image/video capture device (e.g., camera), a touch-screen display integrated with the output device 1016, etc.

The output device 1016 may be any device capable of outputting information from the computing device 1000. The output device 1016 may include one or more of a speaker, a display (LCD, OLED, etc.), a haptic device, a touch-screen display, a light indicator, etc. In some embodiments, the output device 1016 may be a display that can display electronic content (e.g., images, videos, etc.) with different representation effects (e.g., rewind, overlaid animation, etc.). In some embodiments, the computing device 1000 may include a graphics adapter (not shown) for rendering and outputting the electronic content for presentation on the output device 1016. The graphics adapter (not shown) may be a separate processing device including a separate processor and memory (not shown) or may be integrated with the processor 1004 and the memory 1006.

The database(s) 1008 may be data store(s) for storing and providing access to data. The data stored by the database(s) 1008 may be organized and queried using any type of data stored in the database(s) 1008 (e.g., template ID, entity ID, template name, category tag, etc.). The database(s) 1008 may include file systems, databases, data tables, documents, or other organized collections of data. Examples of the types of data stored in the database(s) 1008 may include user data, template data, content item data, etc.

The database(s) 1008 may be included in the computing device 1000 or in another computing system and/or storage system distinct from but coupled to or accessible by the computing device 1000. The database(s) 1008 may include one or more non-transitory computer-readable mediums for storing the data. In some embodiments, the database(s) 1008 may be incorporated with the memory 1006 or may be distinct therefrom. In some embodiments, the database(s) 1008 may store data associated with a database management system (DBMS) operable on the computing device 1000. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The components 1000, 190, 192, 196, and/or other components (e.g., 1002, 1004, 1006, 1008, 1014, and/or 1016), may be communicatively coupled by the bus 1010 and/or the processor 1004 to one another and/or to other components of the computing system 900. As discussed elsewhere herein, the design application 190 may include computer logic (e.g., software logic, hardware logic, etc.) executable by the processor 1004 to provide functionalities for defining templates. The conversion application 192 may include computer logic (e.g., software logic, hardware logic, etc.) executable by the processor 1004 to provide functionalities for generating the template file and asset package for the template. The media publishing application 196 may include computer logic (e.g., software logic, hardware logic, etc.) executable by the processor 1004 to provide functionalities for retrieving the template and applying the template to the content item, editing and modifying the content item incorporated into the template, publishing the result content item (e.g., on the social network page of the user). In any of the embodiments discussed above, the design application 190, the conversion application 192, and the media publishing application 196 may be adapted for cooperation and communication with the processor 1004 and/or other components of the computing system 900.

It should be understood that the computing system 900 illustrated in FIG. 9 and the computing device 1000 illustrated in FIG. 10 are representative of example systems and that a variety of different system environments and configurations are contemplated and are within the scope of the present disclosure. For example, various acts and/or functionality may be moved from a server to a client, or vice versa, data may be consolidated into a single data store or further segmented into additional data stores, and some embodiments may include additional or fewer computing devices, services, and/or networks, and may implement various functionality client or server-side. Further, various entities of the system may be integrated into a single computing device or system or divided into additional computing devices or systems, etc.

Methods are described herein; however, it should be understood that the methods are provided by way of example, and that variations and combinations of these methods, as well as other methods, are contemplated. For example, in some embodiments, at least a portion of one or more of the methods represent various elements of one or more larger methods and may be concatenated or various steps of these methods may be combined to produce other methods which are encompassed by the present disclosure. Additionally, it should be understood that various operations in the methods may in some cases be iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various embodiments are described as having particular hardware, software, and user interfaces. However, the present disclosure applies to any type of computing device that can receive data and commands, and to any peripheral devices providing services.

In some instances, various embodiments may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices can be coupled to the system either directly or through intervening I/O controllers. The data processing system may include an apparatus that may be specifically constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects may not be mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to embodiment in any specific programming language, or for any specific operating system or environment. Accordingly, the disclosure is intended to be illustrative, but not limiting, of the scope of the subject matter set forth in the following claims.

What is claimed is:

1. A method comprising:
    receiving, by one or more processors, a template list and one or more previews of one or more templates in the template list;
    determining, by the one or more processors, a set of templates of the template list that are unlocked for access by a user, the set of templates having a set of previews;
    displaying, by the one or more processors, the set of previews to the user via a graphical interface based on the determined set of templates;
    receiving, by the one or more processors, from the user via the graphical interface, an input selecting a certain template from among the one or more templates;
    based on receiving the input selecting the certain template, retrieving, by the one or more processors, a template file describing the certain template, the template file including one or more template parameters and an asset package for the certain template; and
    displaying, by the one or more processors, a content item of the user integrated into the certain template based on the template file, the content item being separate from the template file.

2. The method of claim 1, wherein:
    the certain template includes a plurality of template pages, each of the plurality of template pages including a parameter defining a file type of the content item to be used with the template page, the certain template including a plurality of file types in the plurality of template pages.

3. The method of claim 1, further comprising:
    receiving, by the one or more processors, one or more user inputs defining the certain template; and
    generating, by the one or more processors, the asset package of the certain template based on the one or more user inputs defining the certain template, the asset package including one or more of an image, a font, an audio file, and an animation effect.

4. The method of claim 3, further comprising:
    generating, by the one or more processors, the one or more template parameters based on the template file and the asset package, the one or more template parameters indicating one or more of a number of template pages in the certain template, a category, and a page format.

5. The method of claim 4, wherein:
    the certain template is defined on a first client computing device, the template file with the one or more template parameters is stored on a server, and the content item is displayed integrated into the certain template on a second client computing device.

6. The method of claim 1, wherein determining the set of templates of the template list that are unlocked for access by the user includes:
    associating, by the one or more processors, a template of the set of templates with an entity code in one or more databases;
    associating, by the one or more processors, a user profile of the user with the entity code in the one or more databases;
    authenticating, by the one or more processors, the user to determine the user profile; and
    receiving, by the one or more processors, an entity list associated with the user profile.

7. The method of claim 6, wherein determining the set of templates of the template list that are unlocked for access by the user includes:
    generating, by the one or more processors, an activation link indicating the entity code;
    transmitting, by the one or more processors, the activation link to a user device of the user; and
    associating, by the one or more processors, the user profile of the user with the entity code based on the activation link in the one or more databases.

8. The method of claim 1, wherein:
    the template file describes one or more template pages of the certain template, each template page including one or more content regions organized based on a layout structure.

9. The method of claim 1, wherein:
    the method further comprises receiving, by the one or more processors, the asset package with the template file, the asset package including one or more media files used in the certain template; and
    displaying the content item of the user integrated into the certain template based on the template file includes inserting each of multiple content elements of the content item into one of multiple template pages of the certain template.

10. A system comprising:
    one or more processors; and
    a memory storing instructions that, when executed by the one or more processors, cause the system to perform operations comprising:
        receiving a template list and one or more previews of one or more templates in the template list;
        determining a set of templates of the template list that are unlocked for access by a user, the set of templates having a set of previews;
        displaying the set of previews to the user via a graphical interface based on the determined set of templates;
        receiving, from the user via the graphical interface, an input selecting a certain template from among the one or more templates;

based on receiving the input selecting the certain template, retrieving a template file describing the certain template, the template file including one or more template parameters and an asset package for the certain template; and displaying a content item of the user integrated into the certain template based on the template file, the content item being separate from the template file.

11. The system of claim 10, wherein:

the certain template includes a plurality of template pages, each of the plurality of template pages including a parameter defining a file type of the content item to be used with the template page, the certain template including a plurality of file types in the plurality of template pages.

12. The system of claim 10, wherein the operations further comprise:

receiving, by the one or more processors, one or more user inputs defining the certain template; and generating, by the one or more processors, the asset package of the certain template based on the one or more user inputs defining the certain template, the asset package including one or more of an image, a font, an audio file, and an animation effect.

13. The system of claim 12, wherein the operations further comprise:

generating, by the one or more processors, the one or more template parameters based on the template file and the asset package, the one or more template parameters indicating one or more of a number of template pages in the certain template, a category, and a page format.

14. The system of claim 13, wherein:

the certain template is defined on a first client computing device, the template file with the one or more generated template parameters is stored on a server, and the content item is displayed integrated into the certain template on a second client computing device.

15. The system of claim 10, wherein determining the set of templates of the template list that are unlocked for access by the user includes:

associating a template of the set of templates with an entity code in one or more databases;

associating a user profile of the user with the entity code in the one or more databases;

authenticating the user to determine the user profile; and receiving an entity list associated with the user profile.

16. The system of claim 15, wherein determining the set of templates of the template list that are unlocked for access by the user includes:

generating an activation link indicating the entity code;

transmitting the activation link to a user device of the user; and associating the user profile of the user with the entity code based on the activation link in the one or more databases.

17. The system of claim 10, wherein:

the template file describes one or more template pages of the certain template, each template page including one or more content regions organized based on a layout structure.

18. The system of claim 10, wherein:

the operations further comprise receiving, by the one or more processors, the asset package with the template file, the asset package including one or more media files used in the certain template; and displaying the content item of the user integrated into the certain template based on the template file includes inserting each of multiple content elements of the content item into one of multiple template pages of the certain template.

19. A method comprising:

receiving, by one or more processors, a template list and one or more previews of one or more templates in the template list;

determining, by the one or more processors, a set of templates of the template list that are unlocked for access by a user, the set of templates having a set of previews;

displaying, by the one or more processors, the set of previews to the user via a graphical interface based on the determined set of templates;

receiving, by the one or more processors, from the user via the graphical interface, an input selecting a certain template from among the one or more templates;

based on receiving the input selecting the certain template, retrieving, by the one or more processors, a template file describing the certain template, the template file including one or more template parameters and an asset package for the certain template, the template file describing one or more template pages of the certain template, each template page including one or more content regions organized based on a layout structure, the asset package including one or more media files used in the certain template; and displaying, by the one or more processors, a content item of the user integrated into the certain template based on the template file including inserting each of multiple content elements of the content item into one of multiple template pages of the certain template, the content item being separate from the template file.

20. The method of claim 19, wherein determining the set of templates of the template list that are unlocked for access by the user includes:

generating an activation link indicating an entity code;

transmitting the activation link to a user device of the user; and associating the user with the entity code based on the activation link.

* * * * *